Oct. 23, 1962 D. H. JONES 3,059,496
STEERING SHAFT MOUNTED SPEEDOMETER
Filed June 17, 1960 2 Sheets-Sheet 2
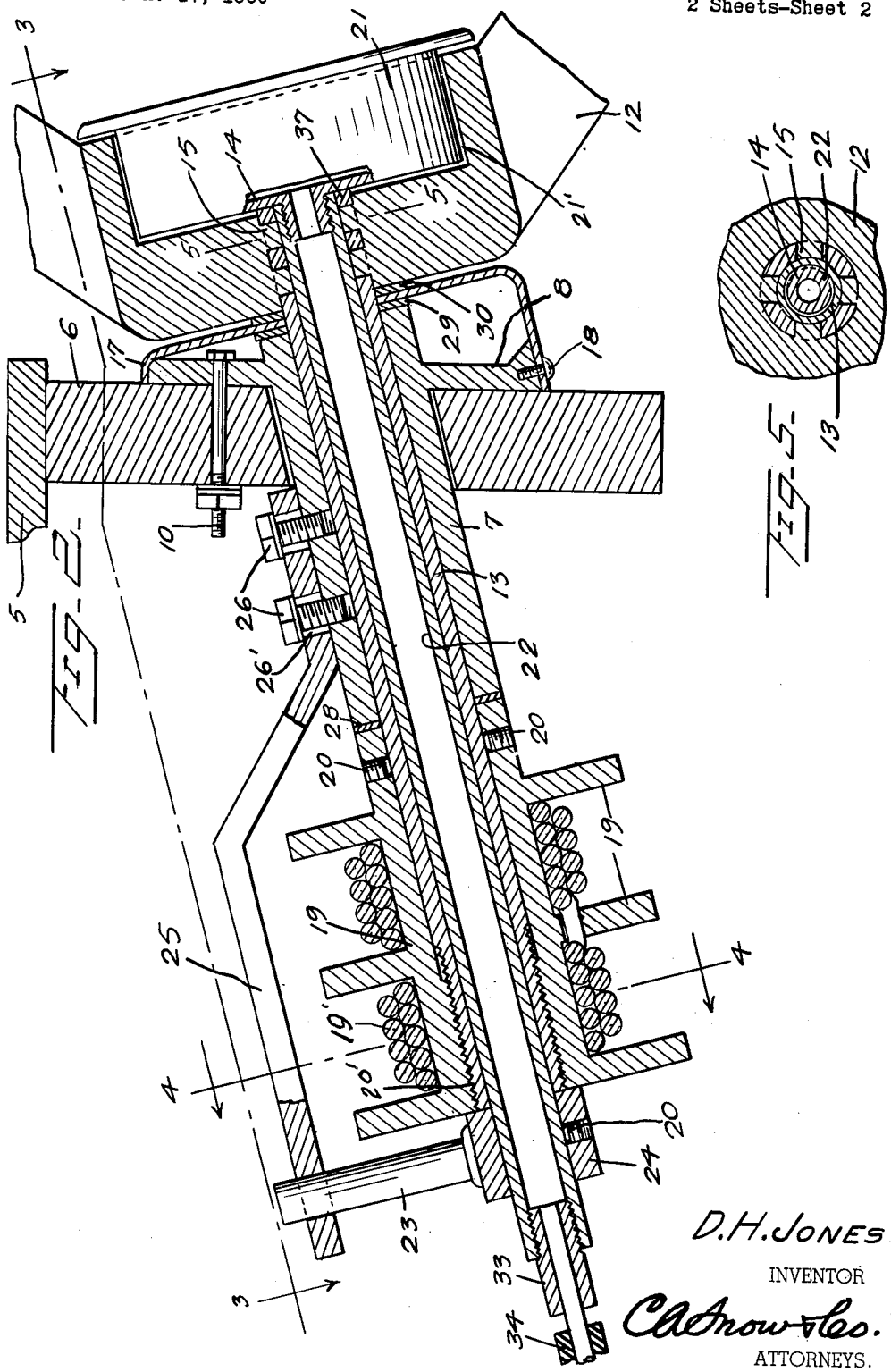
D.H. JONES
INVENTOR
ATTORNEYS.

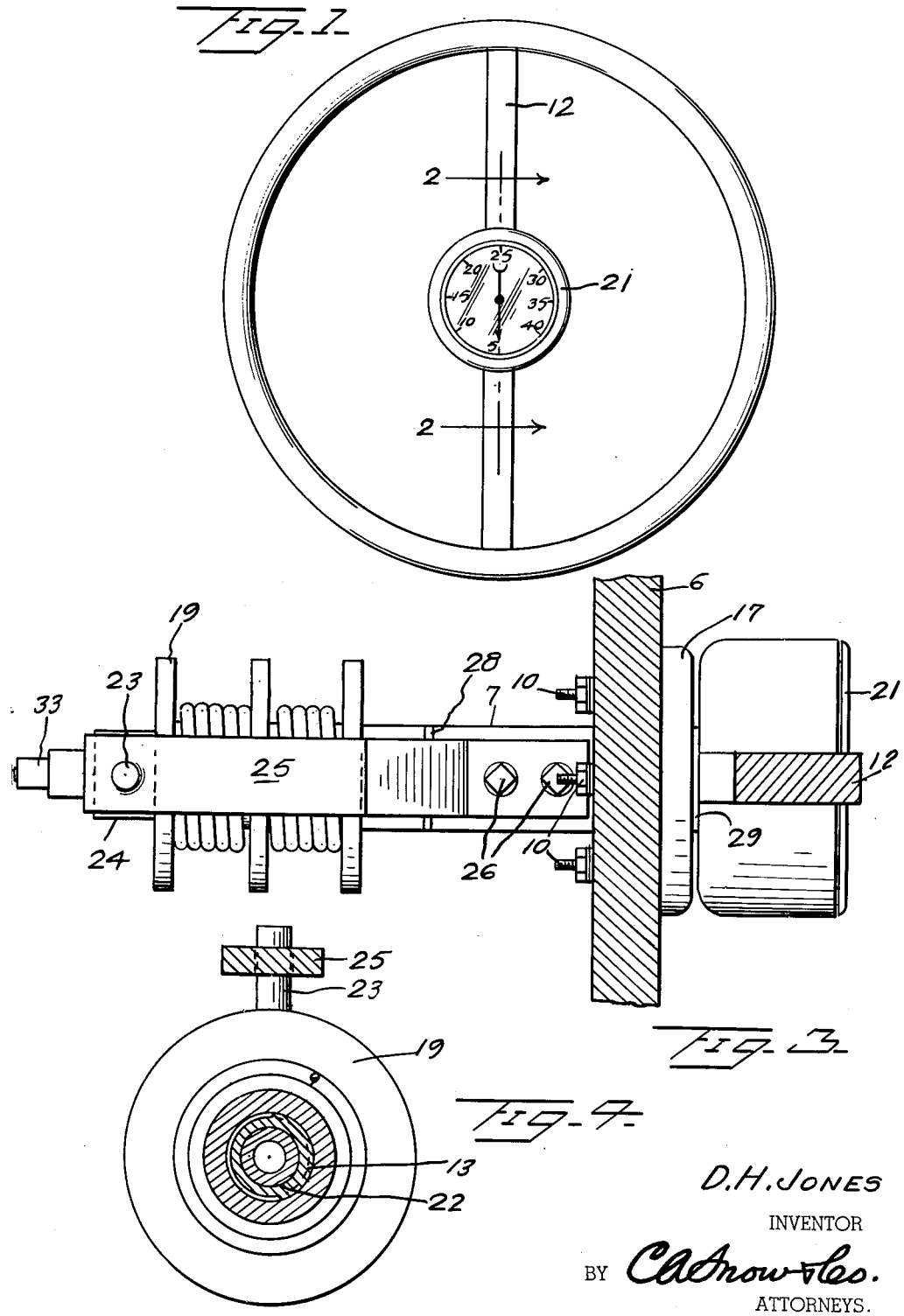

United States Patent Office 3,059,496
Patented Oct. 23, 1962

3,059,496
STEERING SHAFT MOUNTED SPEEDOMETER
David H. Jones, Box 644, Port St. Joe, Fla.
Filed June 17, 1960, Ser. No. 36,800
1 Claim. (Cl. 74—492)

This invention relates to steering wheel construction, an object of the invention being to provide a steering wheel primarily for use in steering boats, wherein the steering wheel is provided with a speedometer or tachometer, mounted on the axis of the steering wheel, where it may be readily viewed by the operator of the boat without removing his eyes from the line of vision in determining the path of travel of the boat, thereby making it possible for the operator of the boat to avoid obstructions such as floating logs or other boats maneuvering in proximity thereto.

An important object of the invention is to provide a stationary speedometer or tachometer mounting which will permit rotation of the steering wheel of the boat independently of the speedometer or tachometer supported thereon.

Still another object of the invention is to provide a speedometer mounted on a steering wheel, which is so constructed and arranged that the speedometer will not in any degree detract from the pleasing appearance and general design of the conventional steering wheel.

Still other objects reside in the combinations of elements, arrangement of parts, and features of construction, all as will be more fully pointed out hereinafter, and disclosed in the accompanying drawings wherein there is shown a preferred embodiment of this inventive concept.

Referring to the drawings:

FIGURE 1 is a plan view of a steering wheel constructed in accordance with the invention, and equipped with a speedometer.

FIGURE 2 is a longitudinal sectional view through the mounting.

FIGURE 3 is a sectional view taken on line 3—3 of FIGURE 2.

FIGURE 4 is a sectional view taken on line 4—4 of FIGURE 2.

FIGURE 5 is a sectional view taken on line 5—5 of FIGURE 2.

Referring to the drawings in detail, the reference character 5 designates the deck of a boat, the reference character 6 indicating the dashboard of the boat on which the steering sleeve 7 is mounted, by means of the supporting bracket 8 secured in place by bolts 10, equally spaced apart, approximately 120 degrees.

The angle of the bracket 8 may be either 20, 30, or 90 degrees with respect to the dashboard 6.

The hollow revolving shaft 13 is formed with openings 15 in the steering wheel end thereof, into which the material of which the steering wheel 12 is formed, finds its way during the construction of the steering wheel, thereby bonding the steering wheel 12 to said shaft 13.

The revolving shaft 13 is constructed of brass material so that it may rotate freely through a close clearance opening in the supporting bracket 8. A housing 17, constructed preferably of chrome material, is provided and encases the supporting bracket 8, said housing being secured in position by means of the screw 18 which is positioned in a threaded opening drilled into the bottom of the supporting bracket 8, as better shown by FIGURE 2 of the drawings.

A drum 19 on which the steering rope or cable 19' is wound, is adjustable on the threaded end of the revolving shaft 13 at 20', and is secured in its position of adjustment on the shaft 13 by the "Allen" screws 20 positioned in countersunk holes, drilled in the shaft 13.

A speedometer indicated by the reference character 21 is positioned in a recess 21' formed axially of the steering wheel, the speedometer being held in place by the threaded pipe 14 extending from the speedometer which is screwed tightly into the end of the stationary shaft 22 against washer 37, providing a watertight mounting. With the speedometer 21 on one end of shaft 22, the shaft is extended through the revolving shaft 13, leaving approximately one eighth of an inch clearance between the speedometer 21 and the steering wheel 12 to prevent rubbing and friction, as the steering wheel 12 is rotated.

The end bracket 23 embodies a rod and a collar 24 mounted on shaft 22 abutting the end of the shaft 13 the collar having a threaded opening in which the threaded end of said rod is positioned, thereby preventing movement of shaft 13 longitudinally of said stationary shaft 22.

The set collar in assembling the device, is placed on the stationary shaft 22 with the rod in an upright position so as to place the rod into the hole in the end of the top bracket 25.

The top bracket 25 is then attached to the steering sleeve 7 by the cap screws 26 extended through the elongated openings 26' in said bracket and screwed into holes drilled and tapped into the steering sleeve 7. The holes or openings which receive the screws, are elongated to allow for adjusting the collar 24 on the end of the bracket against the end of the cable drum 19, a suitable clearance being maintained between the speedometer and the steering wheel, by the end and top bracket, which also prevents the stationary shaft from rotating.

A washer 28 is positioned between the cable drum 19 and the steering sleeve 7, while the washer 29 is placed between the supporting bracket 8 and the chrome housing 17, the washer 30 being placed between the housing 17 and steering wheel 12.

The hose connection 33 connects the hose 34 to the stationary shaft 22 on which the speedometer is mounted.

While I have shown the preferred form of my invention, it will be understood that various changes or modifications may be made within the scope of the appended claims, without departing from the spirit of the invention.

It will be seen that due to the construction shown and described, the speedometer is mounted directly in full view of the person operating the boat, and can be readily examined without removing the eyes from the path of travel of the boat, to the end that the operator will have full control of the boat at all times and can avoid hitting objects such as floating logs or the like which may appear in the path of travel of the boat.

Having thus described the invention, what is claimed is:

A steering mechanism for boats or the like comprising a steering sleeve having a flange adjacent one end thereof defining a supporting bracket by which said steering sleeve is adapted to be secured to a dashboard of a boat, a first tubular shaft concentric with and rotatably mounted in said steering sleeve, a steering wheel having a hub fixed to one end of said first tubular rotatable shaft, a cable drum secured to the other end of said first tubular rotatable shaft and upon which rudder control cables are wound, a second fluid-tight tubular shaft concentrically disposed and extending through said first tubular shaft and the hub of the steering wheel, a speedometer secured to the end of said second shaft extending through the steering wheel hub, a top bracket member secured at one end to said steering sleeve and extending in spaced parallel relation to said cable drum and the free end of said second shaft, means interconnecting said end of the second shaft and said top bracket to prevent rotary and longitudinal movement thereof relative to said first tubular shaft, and hose connector means in the free end of said second tubular shaft.

References Cited in the file of this patent

UNITED STATES PATENTS

| | | | |
|---|---|---|---|
| 1,802,004 | Derr | Apr. 21, | 1931 |
| 1,813,003 | Vonklein | July 7, | 1931 |
| 1,891,208 | Schuetz | Dec. 13, | 1932 |
| 1,914,424 | Hendel | June 20, | 1933 |
| 1,944,905 | Rowell | Jan. 30, | 1934 |
| 2,094,631 | Becker | Oct. 5, | 1937 |
| 2,138,163 | Harris | Nov. 29, | 1938 |
| 2,202,781 | Kennedy | May 28, | 1940 |
| 2,465,825 | Tucker | Mar. 29, | 1949 |
| 2,622,690 | Barenyi | Dec. 23, | 1952 |
| 2,627,833 | Schroeder | Feb. 10, | 1953 |
| 2,926,545 | Loeffler | Mar. 1, | 1960 |
| 2,978,055 | Borenyi | Apr. 4, | 1961 |